United States Patent [19]
Butler

[11] Patent Number: 5,129,207
[45] Date of Patent: Jul. 14, 1992

[54] NET WRAP FEEDING SYSTEM FOR A ROUND BALER

[75] Inventor: Marvin W. Butler, Milwaukee, Wis.

[73] Assignee: Gehl Company, West Bend, Wis.

[21] Appl. No.: 590,299

[22] Filed: Sep. 28, 1990

[51] Int. Cl.⁵ ............................................. B65B 11/04
[52] U.S. Cl. ........................................ 53/118; 53/389.5; 53/587
[58] Field of Search .............. 53/211, 215, 118, 587, 53/389, 389.5; 100/87

[56] References Cited

U.S. PATENT DOCUMENTS

| | | | |
|---|---|---|---|
| 1,033,968 | 7/1912 | Waldron | 53/215 |
| 2,114,008 | 4/1938 | Wunderlich | 53/215 |
| 4,333,301 | 6/1982 | Koutonen | 53/587 |
| 4,485,612 | 12/1984 | Piesen | 53/211 |
| 4,580,398 | 4/1986 | Bruer et al. | 53/118 X |
| 4,676,046 | 6/1987 | Verhulst et al. | 53/118 X |
| 4,697,402 | 10/1987 | Anstey et al. | 53/587 X |
| 4,779,526 | 10/1988 | Frerich | 53/118 |
| 4,787,193 | 11/1988 | Verhulst | 53/118 |
| 4,917,008 | 4/1990 | Van Den Wildenberg | 53/211 |
| 4,956,960 | 9/1990 | Anstey et al. | 53/118 |
| 4,969,315 | 11/1990 | Ardueser et al. | 53/587 |

*Primary Examiner*—John Sipos
*Attorney, Agent, or Firm*—Andrus, Sceales, Starke & Sawall

[57] ABSTRACT

A wrap material dispensing system for supplying wrap material to the bale-forming chamber of a baler for forming round bales of crop material. A wrap material supply assembly is mounted to the baler for supplying wrap material to a conveying assembly for advancing the wrap material to the opening of the bale-forming chamber. The conveying assembly includes a moving belt arrangement in which the wrap material is captured between the baler belts and conveying belts for advancement toward the chamber opening. The conveying belts are arranged so as to be driven by movement of the baler belts.

6 Claims, 2 Drawing Sheets

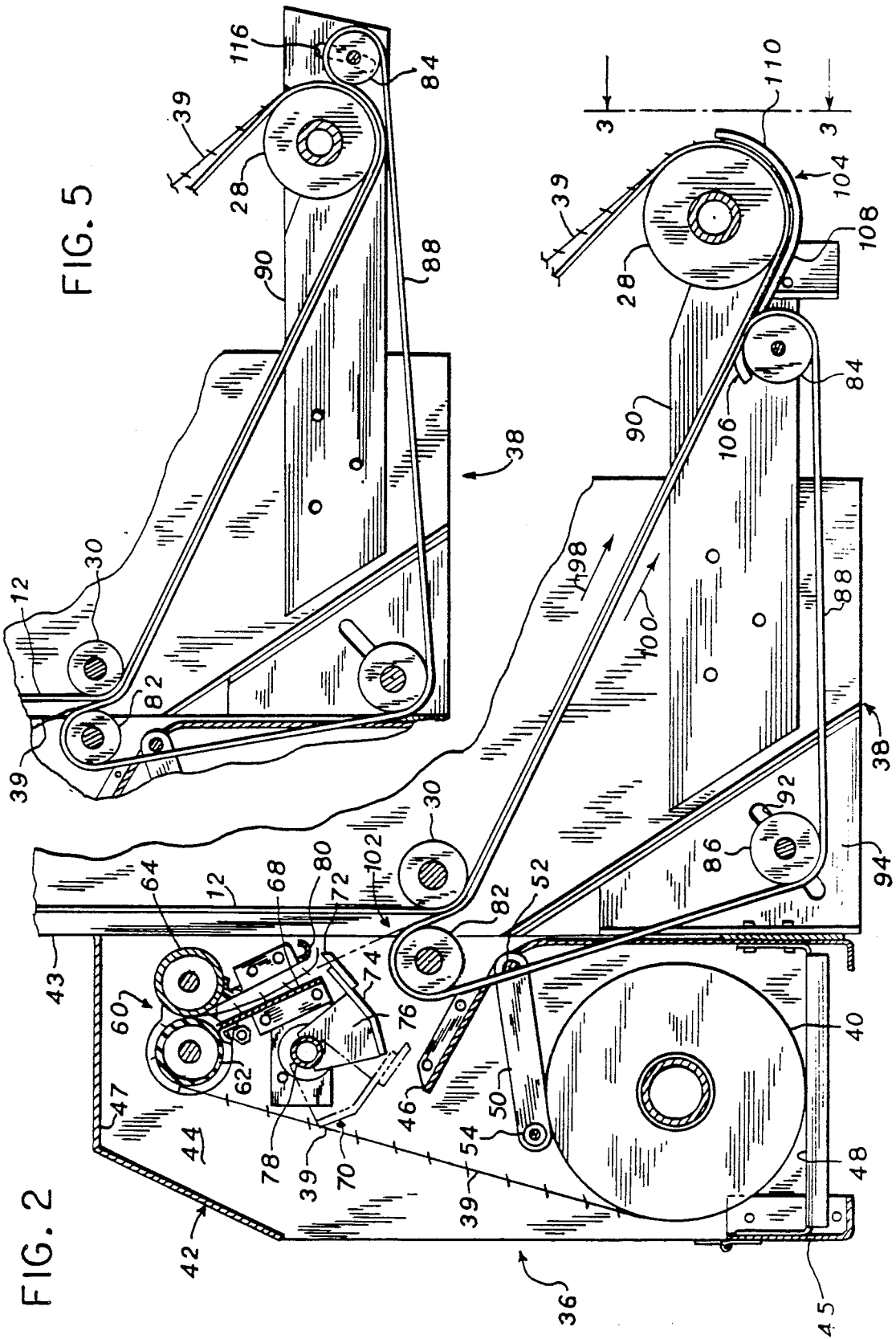

NET WRAP FEEDING SYSTEM FOR A ROUND BALER

BACKGROUND AND SUMMARY OF THE INVENTION

This invention relates to a baler for forming round bales of agricultural crop material, and more particularly to an apparatus and method for wrapping a round bale with wrap material after formation of the bale.

Numerous systems have been developed for dispensing a wrapping material onto a round bale of agricultural crop material after the bale is formed in the bale-forming chamber of a round baler. A round bale wrapped with net wrap material is typically more uniform in its shape than a bale held together with strands of twine, and also is believed to provided less spoilage of the crop material.

The present invention has as its object to provide an apparatus and method for feeding wrap material from a supply roll into the bale-forming chamber. It is a further object of the invention to provide such an apparatus and method which is simple in its design and construction, yet which provides a reliable and highly satisfactory means for transporting the wrap material from the supply roll to the chamber.

In accordance with one aspect of the invention, a round baler having a bale-forming chamber defined by one or more baler belts, is provided with wrap material supply means for supplying wrap material used to wrap the bale after formation, and conveying means for cooperating with the baler belts to transport the wrap material from the wrap material supply means into the bale-forming chamber. The conveying means includes one or more conveying belts located adjacent to one or more of the baler belts, wherein the wrap material is held between the conveying belts and one or more of the baler belts and moved into the bale-forming chamber. In a preferred embodiment, the conveying belts are wrapped around rollers mounted to the baler such that the conveying belts drivingly engage the baler belts, wherein movement of the baler belts drives the conveying belts. One of the rollers around which the conveying belts are wrapped comprises a feed roller which is located adjacent one of the baler rollers, and the feed roller is located such that the conveying belts and the baler belts cooperate to define a narrowing entryway for receiving a free end of the wrap material. The narrowing entryway terminates at a point of contact between the baler belts and the conveying belts. Another roller around which the conveying belts are wrapped comprises a discharge roller, which is located adjacent a baler roller positioned at the bottom of the bale-forming chamber. In one embodiment, the discharge roller is located upstream of the baler roller, and guide means is provided for guiding the wrap material from its discharge from between the baler belts and the conveying belts, around the baler roller into the chamber opening. The guide means preferably comprises a series of spaced belt guides extending from the discharge roller and partially around the baler roller. In another embodiment, the discharge roller is located downstream of the baler roller and is positioned such that the conveying belts wrap around the baler roller along with the baler belts. In this embodiment, the wrap material is discharged from between the baler belts and the conveying belts directly into the chamber opening.

The invention further contemplates a method of dispensing wrap material onto a round bale of crop material. Broadly, the method comprises the steps of supplying wrap material between the baler belts and the conveying belts, and simultaneously moving the baler belts and the conveying belts with the wrap material therebetween to transport the wrap material toward the chamber opening. Further aspects of the method are substantially in accordance with the foregoing summary.

Various other objects, features and advantages of the invention will be made apparent from the following detailed description taken together with the drawings.

BRIEF DESCRIPTION OF THE DRAWINGS

The drawings illustrate the best mode presently contemplated of carrying out the invention. In the drawings:

FIG. 2 is an enlarged partial sectional view of a portion of the baler of FIG. 1, showing the wrap material dispensing system in detail;

FIG. 5 is a partial side elevation view similar to FIG. 2 showing an alternate embodiment of the wrap material dispensing system of the invention.

DETAILED DESCRIPTION OF THE INVENTION

Figure 1:
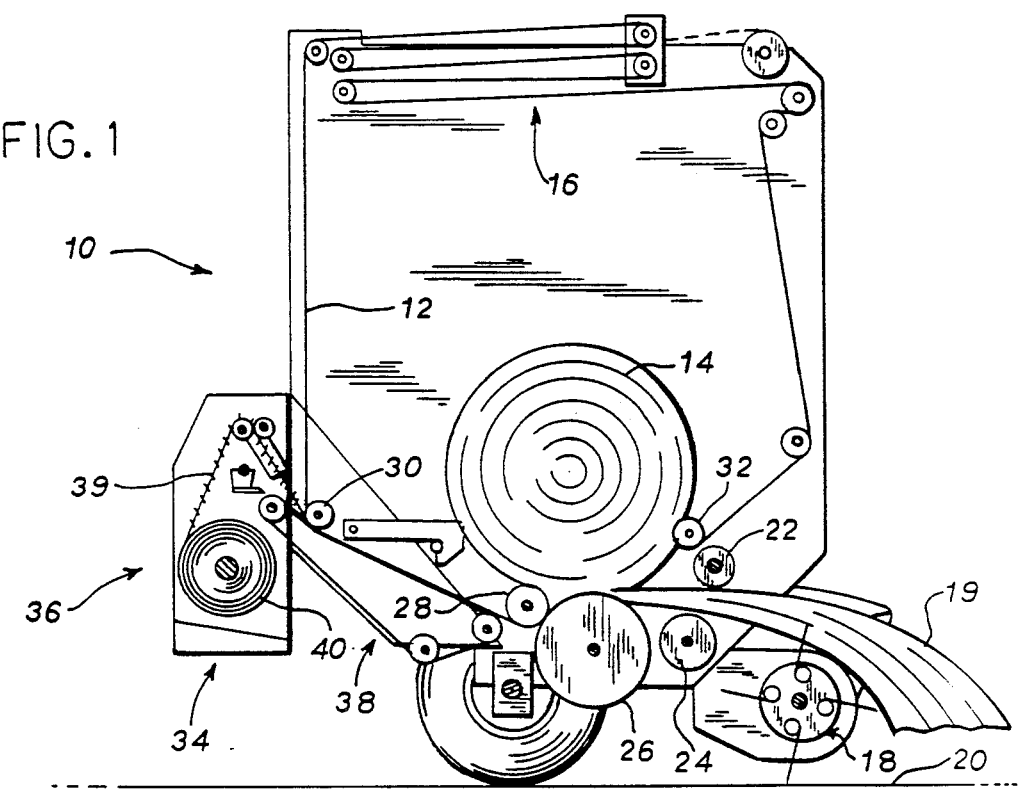
FIG. 1 is a sectional view through a round baler incorporating the wrap material dispensing system: of the invention.

FIG. 1 illustrates a variable chamber round baler 10 which includes a series of side-by-side endless belts, such as shown at 12, which cooperate during operation of baler 10 to define an internal bale-forming chamber. In FIG. 1, the bale-forming chamber is shown occupied by a round bale 14 of crop material during formation.

In accordance with known construction of a baler of this type, baler 10 further includes a take-up assembly 16 for accommodating variations in the size of the bale-forming chamber, and a crop pick-up mechanism 18 for picking up a windrow of crop material 19 from the ground 20 and feeding crop material 19 rearwardly toward the entrance of the bale-forming chamber. A pair of crop inlet rollers 22, 24 are located rearwardly of pick-up mechanism 18 and forwardly of a floor roller 26. Inlet rollers 22, 24 assist in moving crop material 19 rearwardly toward the opening of the bale-forming chamber, and floor roller 26 rotates counter-clockwise below bale 14 to rotate bale 14 in a clockwise direction during bale formation.

Baler 10 further includes a lower front gate roller 28 and a lower rear gate roller 30. The belts 12 of baler 10 are wrapped around front gate roller 28 and define the bale-forming chamber between front gate roller 28 and a roller 32, with the opening into the bale-forming chamber being located between rollers 28 and 32.

A wrap material dispensing system, shown generally at 34, is mounted to the lower rear portion of baler 10. Dispensing system 34 includes a wrap material supply assembly 36 and a conveying assembly 38. Generally, supply assembly 36 acts to unroll wrap material 39 from a supply roll 40 and to supply wrap material 39 to conveying assembly 38, which cooperates with baler belts 12 to move wrap material 39 into the bale-forming chamber for wrapping around bale 14 after bale 14 is fully formed to a desired size.

Wrap material 39 may be any material satisfactorily used to wrap round bales, such as a plastic film, an extruded web-type material, or a netted-type material.

FIG. 2 illustrates wrap material supply assembly 36 and one embodiment of conveying assembly 38 in detail. As shown in FIG. 2, supply assembly 36 includes a housing 42 adapted for connection to the rear wall 43 of baler 10. Housing 42 includes a pair of side walls, one of which is shown at 44. A lower bracket 45 and an upper bracket 46 extend between the side walls, and a sheet metal member 47 encloses housing 42.

Supply roll 40 is placed into the interior of housing 42 and rests on a bottom panel 48. A spring biased arm 50 is connected to side wall 44, to urge supply roll 40 downwardly. A torsion spring is provided about a pin 52 which pivotably connects arm 50 to side wall 44, which maintains a roller 54 at the other end of arm 50 in engagement with supply roll 40.

A wrap material unwinding assembly, shown generally at 60, is located in the upper portion of housing 42. Unwinding assembly 60 includes a pair of pinch rollers 62 and 64 defining a nip through which wrap material 39 passes from supply roll 40. Roller 62 has a surface of rubber or the like, and constitutes the driving roller of the nip. Roller 64 has a steel surface, and constitutes the idler roller of the nip. When wrap material 39 is threaded between rollers 62 and 64, rotation of drive roller 62 results in advancement of wrap material 39 through the nip between the rollers to unwind wrap material 39 from supply roll 40.

A guide member 68 is disposed below the nip defined by rollers 62 and 64 for receiving wrap material 39 downstream therefrom and supporting wrap material 39 as it is fed toward conveying assembly 38. Guide member 68 extends throughout the width of housing 42 between its side walls.

A cut-off assembly, shown generally at 70, is located below rollers 62 and 64 and guide member 68. Cut-off assembly 70 includes a knife 72 mounted to a plate 74 which extends between a series of arms, one of which is shown at 76. The arms, such as 76, are connected at their other ends to a shaft 78, which is pivotably mounted at its ends to the side walls of housing 42. An actuator system, which will later be explained, is mounted to the exterior of housing 42 for moving cut-off assembly 70 between its operative cutting position, shown in solid lines in FIG. 2, and in its operative retracted position shown in phantom lines in FIG. 2. When cut-off assembly 70 is moved to its cutting position, knife 72 is in close proximity to an anvil 80, which provides a shearing action to sever wrap material 39.

Conveying assembly 38 includes a feed roller 82, a discharge roller 84, and an idler roller 86. A series of conveying belts 88 are wrapped around rollers 82-86.

Feed roller 82 is rotatably supported at its ends by the side walls, such as 44, of housing 42. Discharge roller 84 is rotatably supported between a pair of gate arms, one of which is shown at 90, provided on the sides of baler 10. Idler roller 86 is rotatably supported at its ends within slots, such as 92, formed in side panels 94, which are positioned between the lower front portion of housing 42 and the lower rear portion of baler 10. Idler roller 86 is movable to varying positions within the slots 92, for adjusting the tension of belts 88.

Feed roller 82 of conveying assembly 38 is located adjacent rear gate roller 30, and is positioned such that conveying belts 88 engage baler belts 12 at rear gate roller 30 and wrap partially around roller 30 along with baler belts 12. During operation of baler 10, baler belts 12 move in the direction of the arrow 98 along a lower run extending between gate rollers 30 and 28. The engagement of conveying belts 88 with baler belts 12 drives conveying belts 88 along with baler belts 12 in the direction of arrow 100, along an upper run extending between feed roller 82 and discharge roller 84 of conveying assembly 38. The upper run of conveying belts 88 between rollers 82 and 84 extends along a majority of the length of the lower run of baler belts 12 between rollers 30 and 28. As illustrated in FIG. 2, discharge roller 84 is located slightly upstream of lower front gate roller 28.

Conveying belts 88 wrapped around feed roller 82, in combination with baler belts 12 wrapped around rear gate roller 30, cooperate to define a narrowing entryway, shown generally at 102, for receiving the free end of wrap material 39 advanced by operation of pinch rollers 62 and 64 of unwinding assembly 60. Entryway 102 terminates at the point of contact between conveying belts 88 and baler belts 12 as they together wrap around lower rear gate roller 30.

As the free end of wrap material 39 is advanced by operation of pinch rollers 62 and 64 toward entryway 102, it initially contacts either conveying belts 88 or baler belts 12. Belts 88 and 12 are both moving in a direction which guides the free end of wrap material 39 toward entryway 102, and the end of wrap material 39 is thereafter captured between baler belts 12 and conveying belts 88 at their point of contact adjacent rear floor roller 30. When this occurs, the wrap material 39 is held between and advanced by baler belts 12 and conveying belts 88 in the direction of arrows 98, 100, toward discharge roller 84 and lower front gate roller 28. Drive roller 62 is provided with an over-running clutch which accommodates an increased speed of rotation of roller 62 as wrap material 39 is pulled through the nip defined by rollers 62, 64 by baler belts 12 and conveying belts 88.

Figure 3:
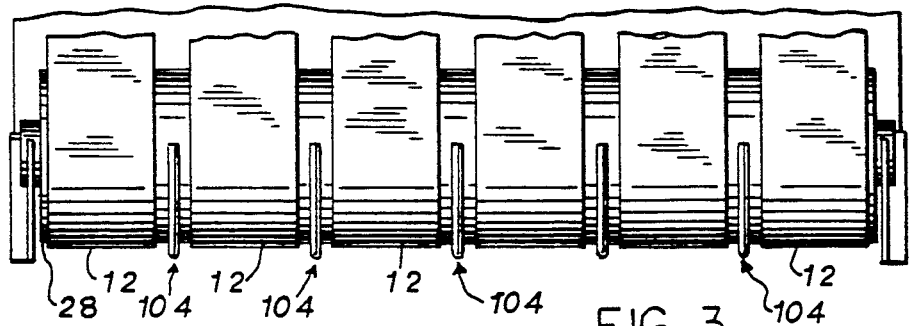
FIG. 3 is a partial front elevation view, reference being made to line 3—3 of FIG. 2.

As noted previously, discharge roller 84 is located upstream of lower front gate roller 28, and wrap material 39 is discharged from between baler belts 12 and conveying belts 88 at the point of separation between belts 12, 88 caused by wrapping of conveying belts 88 around discharge roller 84. A series of belt guides 104 are provided for guiding wrap material 39 around a portion of the periphery of lower front gate roller 28 downstream of discharge roller 84. Guides 104 are mounted through satisfactory mounting structure to the gate arms, such as 90. Guides 104 include a curved upstream end portion 106, a straight middle portion 108, and an end portion 110 curved oppositely from end portion 106 and having a radius slightly larger than the outside radius of roller 28. Upstream of roller 28, the inner surfaces of curved end portions 106 of belt guides 104 extend into the spaces between belts 12, to accurately maintain belts 12 in their proper transverse position. As belt guide end portions 110 wrap around baler roller 28, the inner surface of each belt guide 104 is spaced slightly outwardly from the outer surface of belts 12. Referring to FIG. 3, guides 104 are disposed in spaces between belts 12.

With the arrangement as shown and described, guides 104 cooperate with baler belts 12 to receive wrap material 39 after it is discharged from between baler belts 12 and conveying belts 88, to transport wrap material 39 downstream from discharge roller 84 and to guide the wrap material partially around the periphery of lower front gate roller 28. Wrap material is discharged from curved end portion 110 of guides 104 upwardly into the bale-forming chamber of baler 10, where contact of the end of wrap material 39 with the bale, such as 14, within the bale-forming chamber captures the wrap material between baler belts 12 and the outer surface of the bale, to wrap the bale when desired.

After a satisfactory length of wrap material 39 is wrapped around the bale, which preferably comprises at least one and one-quarter revolutions of bale 14, cut-off assembly 70 is actuated for moving knife 72 to its operative cutting position. When the tip of knife 72 contacts wrap material 39, the tension in wrap material 39 causes wrap material 39 to shear quite easily, after which the remainder of the length of wrap material 39 is advanced between conveying belts 88 and baler belts 12 for wrapping around the bale. When it is again desired to dispense wrapping material onto a formed bale, unwinding assembly 60 is again operated as described previously for feeding the free end of wrap material 39 toward entryway 102.

Figure 4:
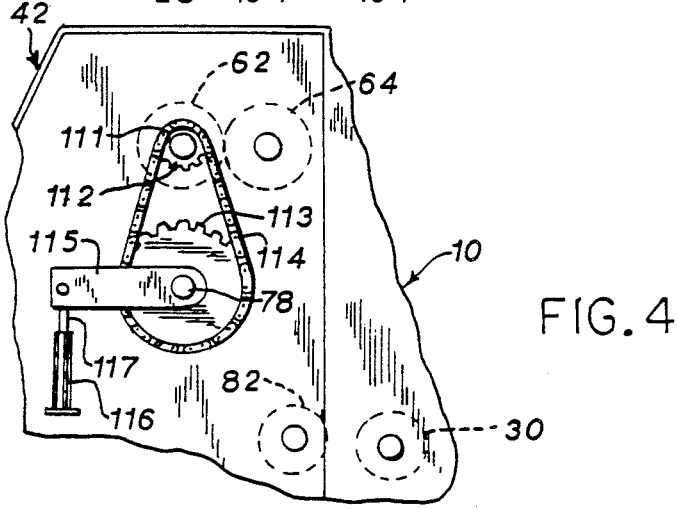
FIG. 4 is a partial side elevation view showing a system for supplying wrap material to the dispensing system shown in FIG. 2.

An arrangement for driving pinch drive roller 62 is shown in FIG. 4. A shaft 111, to which drive roller 62 is mounted and which is supported at its ends by the side walls of housing 42, has a small sprocket 112 connected to its end portion exteriorly of housing 42. A large sprocket 113 is connected to the end portion of cut-off assembly shaft 78, and a chain 114 is trained around sprockets 112 and 113. An actuator arm 115 is also connected to the end of cut-off assembly shaft 78. An electric linear screw-type actuator 116 is mounted to the exterior of housing 42, and has an extendible and retractable rod 117 connected to actuator arm 115.

Cut-off assembly 70 remains in its cutting position, shown in solid lines in FIG. 2, during bale formation. When it is desired to wrap the bale with wrap material, actuator 116 is operated to extend its rod 117, which pivots knife assembly 70 to its inoperative retracted position. Simultaneously, large sprocket 113 is rotated clockwise, resulting in clockwise rotation of small sprocket 112 and shaft 111 to which sprocket 112 is mounted, thereby driving drive roller 62. This operation feeds the free end of wrap material 39 toward entryway 102 an amount sufficient to capture the free end of material 39 between baler belts 12 and conveying belts 88. The over-running clutch of drive roller 62 then allows material 39 to advance between rollers 62 and 64 during wrapping of the bale, as described previously.

Unwinding assembly 60 may be driven in any other satisfactory manner. For example, a belt may be provided extending between sheaves mounted to feed roller 82 and drive roller 62. A selectively actuable clutch mechanism is provided for selectively coupling drive roller 62 to shaft 111, for selectively driving drive roller 62.

Alternatively, unwinding assembly 60 may be operable independently of conveying assembly 38. In this type of arrangement, a driven sheave is connected to the end of drive roller 62 exteriorly of housing 42, and a drive sheave is connected to the end of baler roller 30. A drive belt extends between the drive sheave and the driven sheave, and a selectively actuable clutch is provided for selectively imparting rotation to driven sheave 64.

An alternative arrangement of conveying assembly 38 is illustrated in FIG. 5. In this arrangement, gate arm 90 is provided with a length extending forwardly of lower front gate roller 28, and discharge roller 84 is mounted between the gate arms, such as 90, downstream of lower front gate roller 28. Discharge roller 84 is positioned such that conveying belts 88 remain engaged with baler belts 12 around a portion of the periphery of lower front gate roller 28. With this arrangement, wrap material 39 is discharged from between baler belts 12 and conveying belts 88 at the point of separation therebetween, upwardly toward the opening of the bale-forming chamber of baler 10. Discharge roller 84 may be mounted in curved slots, such as shown at 116, formed in the side members, such as 90, for allowing positioning of discharge roller 84 to provide optimal feeding of wrap material 39 into the bale-forming chamber.

The construction as illustrated in FIG. 5 simplifies the design and construction of conveying assembly 38 in that guides 104 are eliminated. Wrap material is supplied to the bale-forming chamber by belt-to-belt contact throughout conveying assembly 38, and there is no need to "drag" the wrap material over guides to direct the material into the bale-forming chamber.

While the invention has been shown and described with reference to a variable chamber round baler, it is understood that it could also be employed in connection with a fixed chamber baler.

Various alternatives and embodiments are contemplated as being within the scope of the following claims particularly pointing out and distinctly claiming the subject matter regarded as the invention.

I claim:

1. A baler for forming round bales of crop material, comprising:

a bale-forming chamber defined by one or more baler belts and including an opening through which crop material enters the chamber, wherein the baler belts extend along a run between a pair of baler rollers, with a first baler roller being located adjacent the chamber opening and a second baler roller being located upstream of the first baler roller;

wrap material supply means for supplying wrap material used to wrap the bale after formation; and conveying means for cooperating with the baler belts to transport the wrap material from the wrap material supply means toward the opening of the bale-forming chamber, the conveying means including one or more conveying belts located closely adjacent and drivingly engaging one or more of the baler belts, wherein the conveying belts are driven by the baler belts and the wrap material is held between the conveying belts and one or more of the baler belts and moved toward the opening of the bale-forming chamber, and wherein the conveying belts are wrapped around a feed roller located adjacent the second baler roller;

wherein the baler belts and the conveying belts cooperate to transport the wrap material substantially linearly between the second baler roller and the first baler roller, and wherein the surface of the feed roller around which the conveying belts are wrapped is out of alignment with the line of transport of the wrap material, wherein the conveying belts wrap around a portion of the periphery of the second baler roller along with the baler belts.

2. The baler of claim 1, wherein the conveying belts adjacent the feed roller and the baler belts adjacent the second roller cooperate to define a narrowing entryway for receiving a free end of the wrap material, the narrowing entryway terminating at a point of driving engagement between the baler belts and the conveying belts adjacent the second baler roller.

3. A baler for forming round bales of crop material, comprising:
   a bale-forming chamber defined by one or more baler belts and including an opening through which crop material enters the chamber;
   wrap material supply means including a supply roll housing for supplying wrap material from a supply roll to wrap the bale after formation;
   conveying means for cooperating with the baler belts to transport the wrap material from the wrap material supply means toward the opening of the bale-forming chamber, the conveying means including one or more conveying belts located closely adjacent one or more of the baler belts, wherein the wrap material is held between the conveying belts and one or more of the baler belts and moved toward the opening of the bale-forming chamber;
   a selectively actuable cut-off mechanism for severing the wrap material comprising a knife assembly movable between a cutting position and a retracted position;
   a knife actuator assembly interconnected with the knife assembly for moving the knife assembly between its cutting position and its retracted position;
   a nip defined by a pair of pinch rollers for receiving the wrap material from the supply roll of wrap material for feeding the free end of the wrap material toward the conveying means; and
   a drive arrangement disposed between the knife actuator assembly and a first one of the pinch rollers for rotating the first pinch roller a predetermined rotational amount in response to operation of the knife actuator assembly moving the knife assembly from its cutting position to its retracted position and stopping the drive of said first pinch roller rotation when said knife assembly reaches its retracted position for indexingly advancing the free end of the wrap material a predetermined distance to a location where the free end of the wrap material is engaged by the conveying belts and the baler belts.

4. The baler of claim 3, wherein the drive roller is provided with an overrunning clutch to allow it to free wheel after the wrap material is engaged by the conveying belts and the baler belts and is being advanced thereby toward the opening of the bale-forming chamber.

5. A baler for forming round bales of crop material, comprising:
   a bale-forming chamber defined by one or more baler belts and including an opening through which crop material enters the chamber;
   wrap material supply means including a supply roll housing for supplying wrap material from a supply roll to wrap the bale after formation;
   conveying means for cooperating with the baler belts to transport the wrap material from the wrap material supply means toward the opening of the bale-forming chamber, the conveying means including one or more conveying belts located closely adjacent one or more of the baler belts, wherein the wrap material is held between the conveying belts and one or more of the baler belts and moved toward the opening of the bale-forming chamber;
   selectively actuable cut-off mechanism for severing the wrap material, the cut-off mechanism being movable between a cutting position and a retracted position;
   a nip defined by a pair of pinch rollers for receiving the wrap material from the supply roll of wrap material for feeding the free end of the wrap material toward the conveying means; and
   drive means disposed between the cut-off mechanism and a first one of the pinch rollers for driving the first pinch roller in response to movement of the cut-off mechanism from its cutting position to its retracted position, comprising a rotatable drive member mounted to the cut-off mechanism and movable therewith, a rotatable driven member mounted to the drive roller, a drive element drivingly engaged with the drive member and the driven member for imparting rotation to the driven member in response to the rotation of the drive member, and a selectively movable actuator interconnected with the cut-off mechanism and with the drive member for simultaneously moving the cut-off mechanism to its retracted position and imparting rotation to the drive member and stopping the drive of said first pinch roller rotation when said cut-off mechanism reaches its retracted position, to rotate the driven member through the drive element and to thereby drive the drive roller and feed the wrap material to the conveying means.

6. A method of dispensing wrap material onto a round bale of crop material formed in a baler having a bale-forming chamber defined by one or more baler belts, comprising the steps of:
   mounting one or more conveying belts to the baler such that the conveying belts provide a run located closely adjacent a run of the baler belts;
   simultaneously moving the baler belts and the conveying belts with the wrap material therebetween by driving the conveying belts in response to movement of the baler belts, to transport the wrap material toward the opening of the bale-forming chamber;
   moving a cut-off mechanism from a cutting position to a retracted position;
   providing a nip defined by a pair of pinch rollers for receiving the wrap material from a supply roll of wrap material;
   feeding the free end of the wrap material to a location where it is engaged by the baler belts and the conveying belts by indexingly driving a first one of the pinch rollers in response to said movement of the cut-off mechanism from its cutting position to its retracted position and stopping the drive of said first pinch roller when said cut-off mechanism reaches its retracted position;
   allowing the first pinch roller to free wheel during transport of the wrap material toward the opening of the bale-forming chamber by the conveying belts and the baler belts; and
   severing the wrap material after the bale is wrapped by movement of said cut-off mechanism from said retracted position to said cutting position.

* * * * *